Aug. 10, 1965    F. H. SULLY    3,199,831
VALVE
Filed Nov. 28, 1962
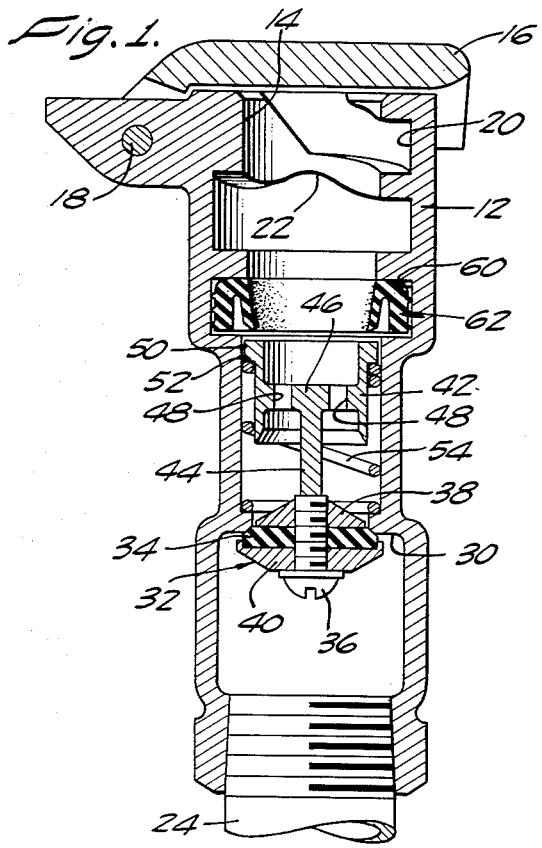
Fig. 1.
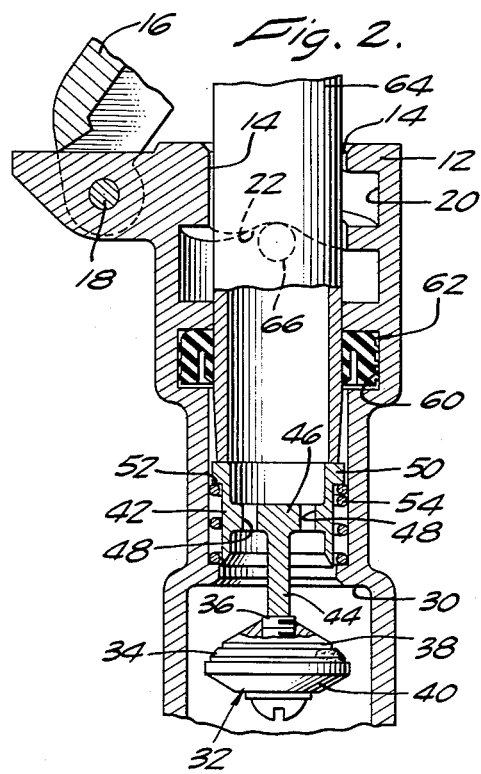
Fig. 2.
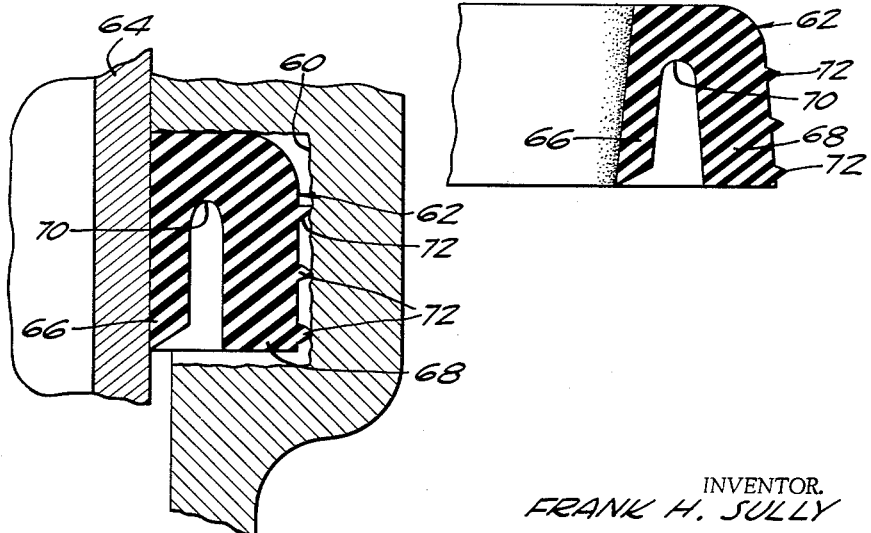
Fig. 3.
Fig. 4.
INVENTOR.
FRANK H. SULLY
BY
*Lyon & Lyon*
ATTORNEYS

United States Patent Office 3,199,831
Patented Aug. 10, 1965

3,199,831
VALVE
Frank H. Sully, La Mirada, Calif., assignor to Western
Brass Works, Los Angeles, Calif., a corporation of
California
Filed Nov. 28, 1962, Ser. No. 240,593
7 Claims. (Cl. 251—149.6)

This invention relates to a valve and more particularly relates to a valve for use in fluid distribution systems and the like.

In sprinkler and irrigation systems, a plurality of valves are commonly positioned in the ground and connected with an underground pipe network. When fluid is to be delivered to a particular area, a surface conduit is connected to the valve thereby putting the surface conduit in communication with the underground pipe network. In order to speed up the connecting operation, quick connect valves have been developed in which the insertion of the surface conduit into a bore in the valve housing causes a valve body to move off its seat, thus immediately forming a flow-through passageway for the fluid.

Since leakage around the inserted surface conduit is undesirable, the valve housing is commonly provided with a groove located about its bore and a sealing member positioned in the groove so as to engage the surface conduit. Inasmuch as the valve housings are ordinarily cast, there arises the problem of potential and often actual leakage of fluid between the sealing member and the rough wall of the groove. This leakage has been combated by machining the walls of the groove so that the sealing member can contact the smooth surface; however, such an operation adds considerably to the expense of the valve. Another proposed solution suggests the provision of a sealing member of low Shore hardness so that the minor irregularities in the casting will imbed themselves in the soft material and create a seal. Such a seal is generally temporarily satisfactory but the tearing of the material as the sealing member shifts slightly during movement of the surface conduit limits the term of effective sealing.

According to the present invention, it has now been found that a quick-connect valve may be provided with a novel sealing member whose material is not torn but which nonetheless provides an effective seal when used with a rough surface. For this purpose, the sealing member is provided with a plurality of annular protrusions or fins which can straddle or fold themselves over imperfections in the wall of the groove. In this manner a durable seal is provided without the necessity of machining down rough walls, thereby reducing the cost of valve construction.

It is, therefore, an object of the present invention to provide a valve suitable for connection to an external conduit.

It is another object of the present invention to provide a valve for quick connection to an external conduit having an improved sealing member for preventing fluid passage around the conduit.

It is also an object of the present invention to provide an improved sealing member for quick-connect valves.

These and other objects and advantages of the invention will become more apparent upon reference to the attached description and drawings in which:

FIGURE 1 is a side sectional elevation of the valve of the present invention;

FIGURE 2 is a side sectional elevation of the valve of the present invention after the insertion of an external conduit therein;

FIGURE 3 is a sectional detail of the sealing member of the present invention; and FIGURE 4 is a sectional detail of the sealing member of the present invention in cooperation with a groove having a rough surface.

Referring now to FIGURE 1, there is shown a valve housing 12 having a central bore 14. The valve housing is provided with a suitable cover 16 pivotally mounted on the housing by means of a cover pin 18. The bore 14 is provided at its upper end with the groove portion 20 of a bayonet joint, the groove including a humped portion 22 for receiving a suitable pin as is well known in the art. At its lower end, the housing 12 is threaded to receive a fluid conduit 24.

An annular ridge or shelf 30 intermediate the ends of the housing 12 serves as a seat for a valve body generally indicated at 32. The valve body 32 consists of a disk 34 of resilient material mounted on a screw 36 by means of a pair of disk retainers 38 and 40. Both the resilient disk 34 and the annular shelf 30 can be beveled to provide firm seating.

The screw 36 is connected to a valve cage 42 which is slidably mounted in the bore 14 by means of a cylindrical depending member 44 which, as shown, is made integral with a crosspiece 46 extending between the interior walls of the valve cage 42 and having a plurality of holes 48 therein for passage of fluid. The valve cage 42 is provided with an annular ring 50 at its upper end to form a shoulder 52. A spring 54 is seated on this shoulder 52 and on the upper surface of the annular shelf 30 to bias the valve cage 42 upwardly in the bore 14 and away from the shelf 30. This upward force is transmitted through the member 44 to the valve body 32 causing it to seat firmly on the beveled portion of the annular shelf 30 and thus prevent passage of fluid from the conduit 24 while the members are in the position shown.

An annular groove 60 is formed in the housing 12 in communication with the bore 14 and in a location above the uppermost position of the valve cage 42. A sealing member 62 whose construction will be described hereinafter is positioned in the groove 60 and extends into the bore 14, thereby serving to engage a conduit inserted into the bore 14.

Turning now to FIGURE 2, the position of the members of the valve are shown after an external conduit 64 is inserted into the bore 14 of the valve housing 12. As can be seen in FIGURE 2, the cover 16 is pivoted away from the bore 14 and the conduit 64 inserted with a longitudinal and rotary motion until a pin 66 mounted on the exterior of the conduit 64 is engaged in the hump 22 of the groove 20, thus maintaining the conduit 64 in position. The lower lip of the conduit 64 engages the upper surface of the valve cage 42 forcing it to move downward against the force of the spring 54 with the result that the valve body 32 is moved away from the annular shelf 30. Fluid from the conduit 24 is thus able to pass through the valve housing to the conduit 64 and thence to any desired area. The sealing member 62 in the groove 60 firmly engages the outer wall of the conduit 64 to prevent leakage of fluid between this conduit and the valve housing.

FIGURE 3 shows the improved structure of the sealing member 62 which enables it to be used with a groove 60 having a rough surface. As can be seen from FIGURE 3, the sealing member 62 has a generally U-shaped radial cross section being formed of two generally annular and coaxial walls 66 and 68 and an end wall 70. The internal wall 66 is tapered toward its axis to assure a good seal with the conduit 64. The outer wall 68 is also tapered, but away from the axis, so that insertion of the conduit 64 and subsequent fluid pressure will cause it to flatten against the wall of the groove 60. The outer wall 68 is provided with a plurality of annular protrusions or fins 72 which are capable of straddling imperfections in an adjacent bottom wall of the groove 60 or of following them to assure a good seal.

It will be noted that the outer wall 68 is about twice as thick as the inner wall 66, so that it will not deform under pressure and engage the groove wall at points intermediate the fins 72.

The performance of this sealing member is shown in FIGURE 4 where the sealing member has been compressed into the groove 60 by the insertion of the conduit 64 into the bore 14 in the housing 12. As can be seen from this figure, the vertical wall of the groove 60 is rough because it is an unmachined cast surface. The fins 72 are flexible and thus can follow the contour of the wall at the point at which they engage it and thus provide a good seal without subjecting the sealing member to a tearing action.

From the foregoing description, it may be seen that a quick-connect valve has been provided that is both durable and inexpensive to manufacture. These features are the result of the provision of a novel sealing member having a number of annular protrusions or fins on its outer surface which enable it to form a good seal with the wall of the groove in which it is seated, even if this wall has a number of imperfections.

The invention may be embodied in other specific forms not departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a valve adapted to receive an external member, the combination comprising: a valve housing having a bore therein, an annular shelf extending into said bore intermediate the ends thereof and an annular rough-walled groove remote from said shelf in communication with said bore; a valve cage slidably mounted in said bore on one side of said shelf; a valve body slidably mounted in said bore on the other side of said shelf and adapted to seat thereon; means connecting said valve cage to said valve body whereby movement of said valve cage toward said shelf causes said valve body to move away from said shelf; spring means mounted in said bore on said shelf to bias said valve cage away from said shelf; and a generally annular sealing member positioned in said groove and extending partially into said bore, said sealing member having a first tapered generally annular wall; a second tapered generally annular wall coaxial with said first wall; said second wall being positioned outwardly of said first wall and being thicker than said first wall; a third wall connecting said first and said second generally annular walls, said first and second generally annular walls tapering away from said connecting wall; and a plurality of flexible annular projections extending outwardly from said second wall and engaging the wall of said groove.

2. A sealing member comprising: first and second generally annular walls; said first and second generally annular walls being coaxial, said first generally annular wall being inclined toward the axis of said walls and the second generally annular wall being inclined away from said axis; said second wall being positioned outwardly of said first wall and being thicker than said first wall; a third wall joining said first and second generally annular walls at the ends thereof having minimum spacing; and a plurality of flexible annular projections extending outwardly from said second annular wall.

3. In a valve adapted to receive an external member, the combination comprising: a valve housing having a bore therein, an annular shelf extending into said bore intermediate the ends thereof and an annular rough-walled groove remote from said shelf in communication with said bore; a valve cage slidably mounted in said bore on one side of said shelf; a valve body slidably mounted in said bore on the other side of said shelf and adapted to seat thereon; means connecting said valve cage to said valve body whereby movement of said valve cage toward said shelf causes said valve body to move away from said shelf; spring means mounted in said bore on said shelf to bias said valve cage away from said shelf; and a sealing member positioned in said groove and extending partially into said bore, said sealing member having first and second generally annular walls, said first and second generally annular walls being coaxial, said first generally annular wall inherently tending to assume an attitude inclined toward the axis of said walls and the second generally annular wall inherently tending to assume an attitude inclined away from said axis, said second wall being positioned outwardly of said first wall and being thicker than said first wall, a third wall joining said first and second generally annular walls at the ends thereof having minimum spacing, and at least one annular protrusion extending outwardly from said second annular wall for contacting the wall of said groove.

4. In a valve of the type adapted to receive an external fluid conduit and including a valve housing having a bore therein, an annular shelf extending into said bore intermediate the ends thereof, and an annular groove remote from said shelf and in communication with said bore; a valve cage slidably mounted in said bore on one side of said shelf and a valve body slidably mounted in said bore on the other side of said shelf, said valve cage and said valve body being connected together so that movement of said valve cage towards said shelf causes said valve body to move away from said shelf, said valve cage being engageable with said external fluid conduit when said external fluid conduit is inserted in said bore; and spring means mounted in said bore on said shelf to bias said valve cage away from said shelf; the improvement comprising: a sealing member positioned in said groove, said sealing member comprising a first generally annular wall; a second generally annular wall coaxial with said first wall; said second wall being positioned outwardly of said first wall and being thicker than said first wall; a third wall connecting said first and second generally annular walls, said first and second generally annular walls inherently tending to assume an attitude diverging away from said connecting wall; and a plurality of flexible annular projections extending outwardly from said second wall and engaging the wall of said groove.

5. For use in a valve adapted to receive an external member and including a cast valve housing having a bore therein, an annular shelf extending into said bore intermediate the ends thereof and an unmachined annular groove remote from said shelf and in communication with said bore; a valve cage slideably mounted in said bore on one side of said shelf; a valve body slideably mounted in said bore on the other side of said shelf and adapted to seat thereon; means connecting said valve cage to said valve body whereby movement of said valve cage toward said shelf causes said valve body to move away from said shelf; the improvement comprising: a sealing member adapted to be positioned in said annular groove, said sealing member having a first generally annular wall; a second generally annular wall concentric with said first wall; said second wall being positioned outwardly of said first wall and being thicker than said first wall; a third wall connecting said first and second generally annular walls, said first and second generally annular walls normally diverging in a direction away from said connecting wall; and a plurality of flexible annular projections extending outwardly from said second wall for straddling or following imperfections in the unmachined annular wall of said groove when said sealing member is mounted in said groove whereby a good seal is formed.

6. In a valve adapted to receive an external member, the combination comprising: a cast valve housing having a bore therein, an annular shelf extending into said bore intermediate the ends thereof and an annular groove having a rough cast surface remote from said shelf in communication with said bore; a valve cage slidably mounted in said bore on one side of said shelf; a valve body slidably mounted in said bore on the other side of said shelf and adapted to seat thereon; means connecting said valve cage to said valve body whereby movement of said valve cage toward said shelf causes said valve body to move away from said shelf; spring means mounted in said bore on said shelf to bias said valve cage away from said shelf; and a generally annular sealing member positioned in said groove and extending partially into said bore, said sealing member having a first generally annular wall having a smooth inner surface; a second generally annular wall coaxial with said first wall; said second wall being positioned outwardly of said first wall; a third wall connecting said first and said second generally annular walls, said first and second generally annular walls diverging away from said connecting wall; and a plurality of flexible annular projections extending outwardly from said second wall and engaging the rough cast wall of said groove.

7. A valve as defined in claim 6 wherein said second wall is thicker than said inner wall.

References Cited by the Examiner

UNITED STATES PATENTS

| | | | |
|---|---|---|---|
| 2,173,295 | 9/39 | Coles | 251—149.6 XR |
| 2,265,267 | 12/41 | Cowles | 251—149.6 |
| 2,898,128 | 8/59 | Shohan | 137—322 XR |
| 3,049,357 | 8/62 | Kosatka | 277—208 XR |

FOREIGN PATENTS

| | | |
|---|---|---|
| 1,190,948 | 4/59 | France. |
| 810,625 | 3/59 | Great Britain. |

M. CARY NELSON, *Primary Examiner.*